United States Patent
Kojima et al.

(10) Patent No.: US 8,042,257 B2
(45) Date of Patent: Oct. 25, 2011

(54) METHOD FOR MANUFACTURING A STATOR CORE FOR AN AXIAL AIR-GAP ELECTRONIC MOTOR

(75) Inventors: Tomonori Kojima, Kawasaki (JP); Hisao Igarashi, Kawasaki (JP); Hitoshi Kurita, Kitakyushu (JP); Norio Tosu, Kitakyushu (JP)

(73) Assignee: Fujitsu General Limited, Kawasaki-Shi, Kanagawa-Ken (JP)

( * ) Notice: Subject to any disclaimer, the term of this patent is extended or adjusted under 35 U.S.C. 154(b) by 1115 days.

(21) Appl. No.: 11/717,079

(22) Filed: Mar. 13, 2007

(65) Prior Publication Data

US 2007/0214632 A1    Sep. 20, 2007

(30) Foreign Application Priority Data

Mar. 15, 2006 (JP) .................. 2006-070580

(51) Int. Cl.
H02K 15/02 (2006.01)
H02K 1/16 (2006.01)
H02K 1/18 (2006.01)

(52) U.S. Cl. ............. 29/598; 310/216.007; 310/216.062

(58) Field of Classification Search .................... 29/596; 83/556, 558; 310/216.007, 216.045, 216.062
See application file for complete search history.

(56) References Cited

U.S. PATENT DOCUMENTS

| 2,495,218 A | * | 1/1950 | Aske | ........................ 310/216.008 |
| 2,557,249 A | * | 6/1951 | Aske | ............................. 310/112 |
| 5,604,971 A | * | 2/1997 | Steiner | ............................ 29/596 |

* cited by examiner

*Primary Examiner* — Livius R Cazan
(74) *Attorney, Agent, or Firm* — Manabu Kanesaka (57) ABSTRACT

There is provided a method for manufacturing a stator core for an axial air-gap electronic motor, in which core sheets are laminatedly fixed while being shifted with predetermined intervals. The method includes a step in which first side surfaces in the circumferential direction (first slot surfaces 25) of the first to nth (n is a positive integer) core sheets are blanked out of a mother sheet 60 by moving first blanking punches 360 with predetermined intervals via a first control means 700; and a second blanking step in which second side surfaces in the circumferential direction (second slot surfaces 26) of the first to nth (n is a positive integer) core sheets are blanked in succession by moving a second blanking punch 460 with predetermined intervals via a second control means 700.

8 Claims, 8 Drawing Sheets

METHOD FOR MANUFACTURING A STATOR CORE FOR AN AXIAL AIR-GAP ELECTRONIC MOTOR

TECHNICAL FIELD

The present invention relates to a method for manufacturing a stator core for an axial air-gap electronic motor in which a rotor and a stator are arranged oppositely along the axis direction of a rotor output shaft. More particularly, it relates to a method for manufacturing a stator core for an axial air-gap electronic motor, in which core sheets are laminated into a trapezoidal shape along the radial direction.

BACKGROUND ART

For example, as shown in Japanese Patent Application Publication No. 2004-282989, an axial air-gap electronic motor is formed so that a rotor is arranged along the axis direction of a rotor output shaft oppositely on both sides (or on one side) of a disc-shaped stator with a predetermined gap being provided therebetween. The axial air-gap electronic motor has an advantage of being capable of being made small in size because the axial length thereof can be shortened.

The stator has a plurality of stator cores (core members), and the stator cores are arranged in an annular shape around a bearing portion provided in the center, and are molded integrally by synthetic resin. The stator core for the axial air-gap electronic motor is formed by laminating a plurality of core sheets along the radial direction. To increase the torque, the stator core is contrived to increase the teeth area by being formed into a trapezoidal shape such that the width in the circumferential direction increases gradually from the center side to the outside.

Also, in some stator cores, a configuration also has been proposed in which the side surface in the circumferential direction (slot surface) is provided with a skew to restrain the occurrence of cogging torque. However, the manufacture of the stator core for the axial air-gap electronic motor has problems described below.

In the case of the stator core for the axial air-gap electronic motor, unlike the inner rotor electronic motor, the stator cores are laminated along the radial direction. Therefore, since the teeth surface must be formed into a trapezoidal shape, the shape of core sheet must be changed one by one. Also, since the shape must be changed every one sheet, blanking dies corresponding to the number of core sheets are needed, which increases the production cost.

Also, in order for the slot surface to take a slantwise shape, the core sheets must be laminated while shifting slightly one by one, which takes much time and labor. Further, since the core sheets are laminated in a shifted state, the positioning requires a technique.

SUMMARY OF THE INVENTION

The present invention has been made to solve the above problems, and accordingly an object thereof is to provide a method for manufacturing a stator core for an axial air-gap electronic motor, in which core sheets are laminatedly fixed while being shifted with predetermined intervals.

To achieve the above object, the present invention has some features described below. The present invention provides a method for manufacturing a stator core for an axial air-gap electronic motor in which a stator and a rotor are arranged oppositely along the axis line direction of a rotor output shaft, the stator core, consisting of a laminated body formed by laminating a plurality of core sheets blanked from a metallic mother sheet in the radial direction, being formed into a trapezoidal shape the circumferential width of which increases gradually from the center of the rotor output shaft toward the outside, wherein a first cutting portion for forming a first side surface (first slot surface) in the circumferential direction of the core sheet, a second cutting portion for forming a second side surface (second slot surface) in the circumferential direction of the core sheet, a first moving means for reciprocatingly moving the first cutting portion, and a second moving means for reciprocatingly moving the second cutting portion are provided, and the method includes a first blanking step in which the first slot surfaces of the first to nth (n is a positive integer) core sheets are blanked in succession out of the mother sheet by moving the first cutting portion with predetermined intervals via the first moving means on the mother sheet; and a second blanking step in which the second slot surfaces of the first to nth (n is a positive integer) core sheets are blanked in succession out of the mother sheet by moving the second cutting portion with predetermined intervals via the second moving means.

According to this method, the width between the side surfaces (the first slot face and the second slot surface) in the circumferential direction of the stator core can be changed by the two cutting portions moving independently, by which the stator core can be laminated without the use of a plurality of dies.

As a more favorable mode, the first cutting portion and the second cutting portion are arranged oppositely so as to be brought close to each other or separated from each other.

According to this method, by arranging the first cutting portion and the second cutting portion oppositely so as to be brought close to each other or separated from each other, a more space-saving die can be obtained in the case where the slot surfaces are symmetrical in the right and left direction.

As a more favorable mode, the first cutting portion and the second cutting portion move asynchronously.

According to this method, since the cutting portions are driven asynchronously, a core sheet in which the slot surfaces are asymmetrical in the right and left direction can be manufactured.

Preferably, the first cutting portion is provided in a pair at the right and left with a predetermined clearance being provided therebetween, and the second cutting portion is arranged therebetween, whereby the first and second slot surfaces of two of the core sheets are blanked out of the mother sheet.

Preferably, the stator core is assembled in point symmetry by laminating the core sheets blanked out of the mother sheet along the radial direction.

According to this method, the second cutting portion is arranged between the paired right and left first cutting portions and these cutting portions are driven asynchronously, so that two core sheets can be manufactured at the same time. Also, by blanking the core sheets in a point symmetry shape, two second slot surfaces can be blanked at the same time by one second cutting portion. Therefore, the yield increases, and hence the productivity can further be improved.

Preferably, a third cutting portion for blanking the radial side surface (teeth surface) of the core sheet out of the mother sheet is further provided, and a third blanking step is provided to completely separate the core sheet from the mother sheet by means of the third cutting portion after a first and a second blanking steps.

According to this method, after the right and left slot surfaces have been blanked, the radial side surface of the core sheet is blanked by the third cutting portion, by which the center position of core sheet can be positioned easily, so that the accuracy of lamination can be increased.

Preferably, a pilot hole blanking step is further provided to form a pilot hole, which serves as a reference for the blanking steps, in the mother sheet.

According to this method, the blanking accuracy can be increased further, and also the work speed can be increased to improve the productivity.

As a preferable mode, a concave/convex forming step is included between the second blanking step and the third blanking step to form a concave/convex portion for laminating and stakingly fixing the core sheets in a part of the core sheet.

Also, the core sheet is separated from the mother sheet in the third blanking step, and at the same time, is laminatedly fixed to the core sheet blanked before.

According to this method, by providing the concave/convex forming step for forming the concave/convex portion for staking in a part of the core sheet in the front of the third blanking step, the blanked core sheets are laminated, and at the same time, the core sheets can be fixed by staking.

DETAILED DESCRIPTION

Figure 1:
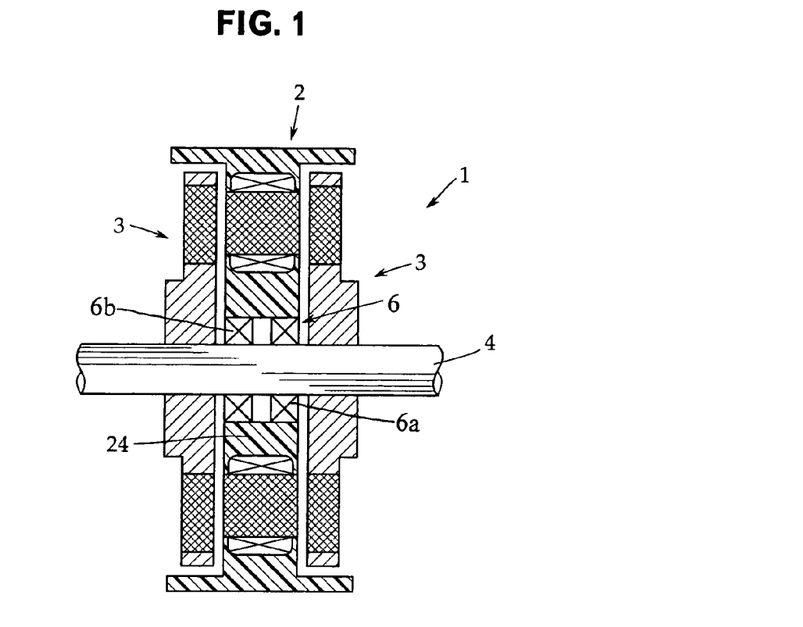
FIG. 1 is a sectional view schematically showing an axial air-gap electronic motor manufactured by a manufacturing method in accordance with the present invention.
Figure 2:
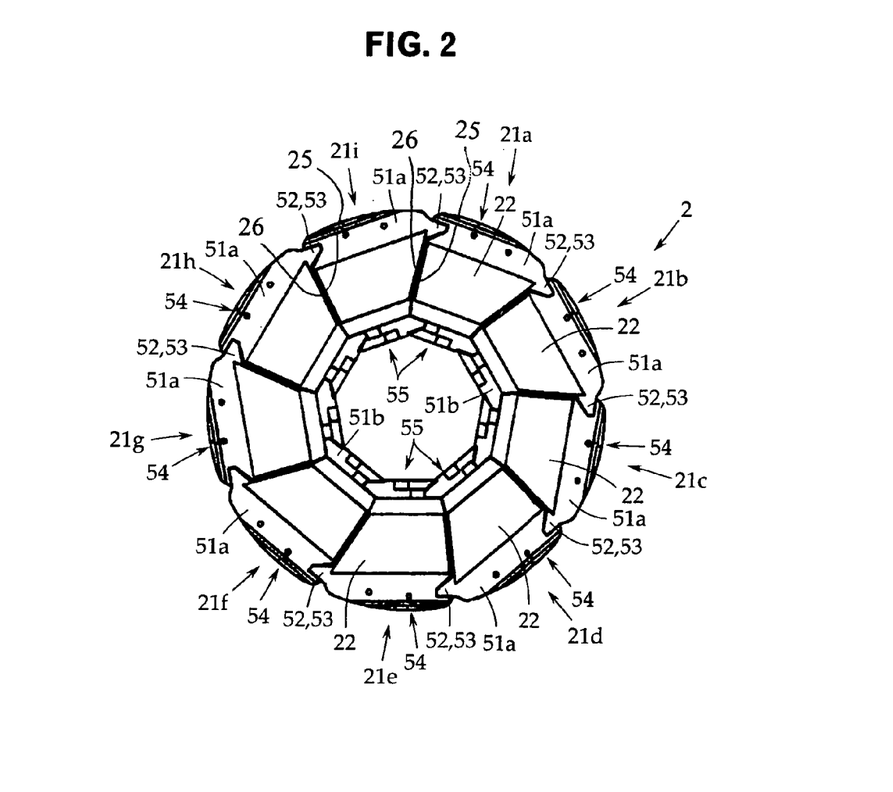
FIG. 2 is a front view of a stator of the axial air-gap electronic motor shown in FIG. 1.

An embodiment of the present invention will now be described with reference to the accompanying drawings. FIG. 1 is a schematic sectional view of an axial air-gap electronic motor having a stator core, which is manufactured by a manufacturing method in accordance with one embodiment of the present invention, and FIG. 2 is a front view of a stator of the axial air-gap electronic motor shown in FIG. 1.

The axial air-gap electronic motor 1 includes a stator 2 formed into a disc shape and a pair of rotors 3 arranged oppositely on both side surfaces of the stator 2 with a predetermined gap being provided therebetween. Each of the rotors 3 is coaxially fixed to a rotor output shaft 4 that produces a rotational driving force.

The stator 2 and the rotors 3 are housed in a bracket, not shown. In this example, the outer peripheral surface of the stator 2 is also used as the outer peripheral wall of the bracket, and at both ends thereof, a lid member, not shown, is installed. The rotors 3 may be attached directly to a fan or the like without the use of the lid member.

Although the rotors 3 are arranged on both, right and left, sides with the stator 2 being held therebetween in this example, only either one of the rotors 3 may be arranged. In the present invention, the configuration of the rotor has only to have functions necessary for constituting the axial air-gap electronic motor 1, and can be changed arbitrarily according to the specifications.

Also, although the rotors 3 commonly use the same rotor output shaft 4 in this example, a 2-output shaft type having a rotor output shaft for each of the rotors 3 may be used. Further, a shaft-less type, in which the rotors 3 are directly supported on the stator 2 via radial ball bearings without the use of the rotor output shaft 4, may be used.

As shown in FIG. 2, the stator 2 includes a plurality of (nine, in this example) pole members 21a to 21i arranged annularly with the rotation axis of the rotor output shaft 4 being the center axis. Each of the pole members 21a to 21i has the same construction, so that, in this example, explanation is given by taking the pole member 21a as an example.

In the central portion of the stator 2, a bearing section 6 is arranged. In this example, the bearing section 6 has a pair of radial ball bearings 6a and 6b, and the inner races thereof are press fitted on the rotor output shaft 4, and the outer race side is embedded in a synthetic resin material 24 that stiffens the stator 2.

Figure 3A:
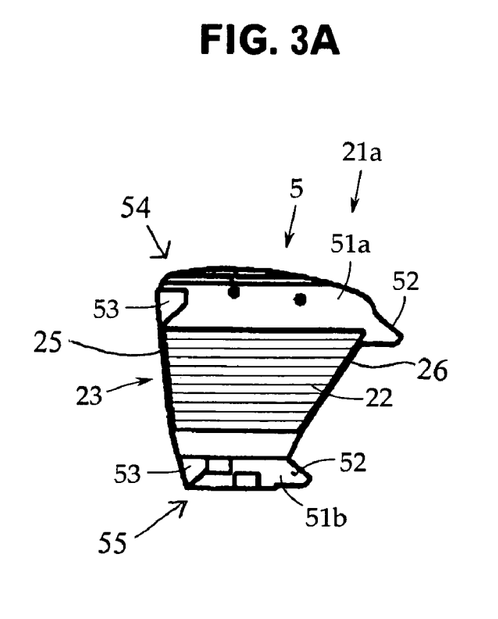
FIG. 3A is a front view of a pole member constituting the stator shown in FIG. 2.
Figure 3B:
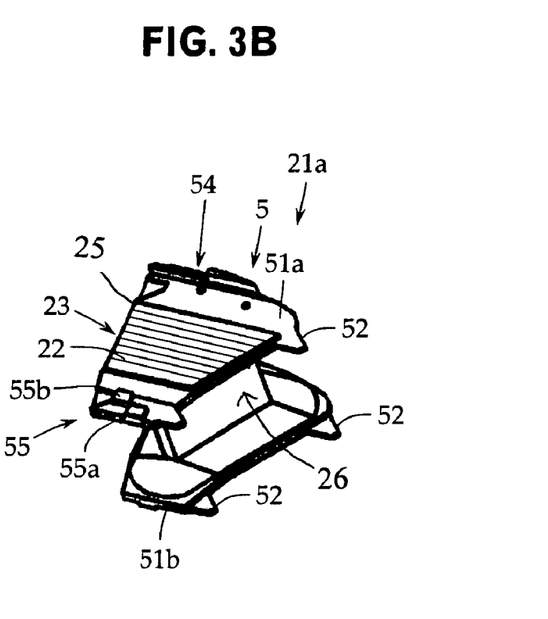
FIG. 3B is a perspective view of a pole member constituting the stator shown in FIG. 2.

As shown in the front view of FIG. 3A and the perspective view of FIG. 3B, the pole member 21a is formed by winding a coil, not shown, on a bobbin-shaped stator core 23 having a pair of, right and left, flange-shaped teeth surfaces 22. The stator core 23 is formed by laminating magnetic steel sheets each formed into an H shape along the radial direction.

The whole of the stator core 23 excluding the teeth surfaces 22 is covered with an insulator 5 made of an insulating resin. The insulator 5 has flange portions 51a and 51b extending in the radial direction along the teeth surfaces 22, and the flange portions 51a and 51b also form a part of the bobbin on which the coil is wound.

Each of the flange portions 51a and 51b is provided with two connecting means for connecting the pole members 21a to 21i to each other in a different mode. As a first connecting means, a locking convex portion 52 for connecting the pole members 21a to 21i to each other in an annular form with the axis line of the rotor output shaft 4 being the center and a locking concave portion 53 to which the locking convex portion 52 is locked are provided in the end portions in the circumferential direction of the flange portions 51a and 51b.

The locking convex portion 52 is provided so as to project from one end portion (right-hand side surface in FIG. 3A) in the circumferential direction of the flange portions 51a, 51b toward the outside. In this example, the locking convex portion 52 consists of a tongue element formed into a triangular shape. In contrast, the locking concave portion 53 consists of a notch portion formed so as to be directed from the other end portion (left-hand side surface in FIG. 3A) in the circumferential direction of the flange portions 51a, 51b toward the inside, and is formed as a triangularly shaped groove engaging with the locking convex portion 52.

Although the locking convex portion 52 and the locking concave portion 53 are formed into a triangular shape in this example, the shapes of the locking convex portion 52 and the locking concave portion 53 can be changed to an arbitrary shape such as a square shape or a semicircular shape according to the specifications if the shape is such that the pole members 21a to 21i can be connected to each other in an annular form.

According to this connecting means, by engaging the locking convex portion 52 and the locking concave portion 53 with each other, the pole members 21a to 21i can be connected in an annular form with the axis line of the rotor output shaft 4 being the center.

In this example, as a second connecting means, the flange portions 51a and 51b each are provided with locking ribs 54 and 55 for connecting the pole members 21a to 21i in a one-row rod form. However, since the second connecting means is an arbitrary item in the present invention, the explanation thereof is omitted.

Figure 10:
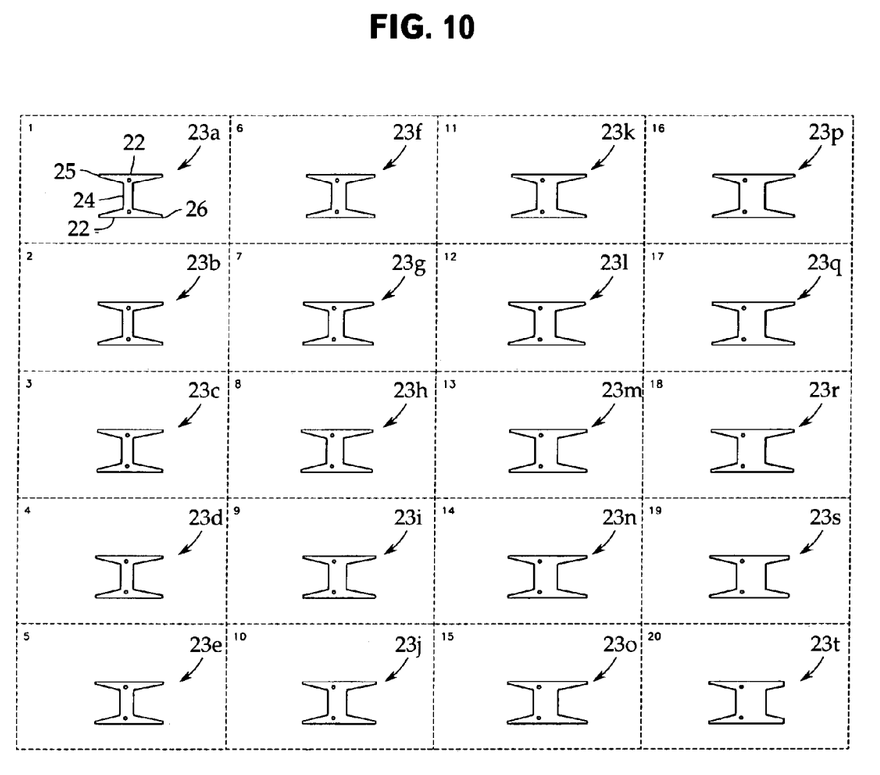
FIG. 10 is a front view showing a state in which core sheets are disassembled and arranged in order from the inside diameter side to the outside diameter side.

As shown in FIG. 10, the stator core 23 has a plurality of core sheets (in the example, twenty core sheets 23a to 23t) consisting of magnetic steel sheets, and is formed by laminating these core sheets along the radial direction of the stator 2. In this example, the core sheets 23a to 23t are arranged in the order such as to be directed from the inside toward the outside in the radial direction.

Each of the core sheets 23a to 23t is formed into an H shape, and the teeth surfaces 22 are provided at both ends of a coil winding portion 24 extending along in the axial direction. As shown in FIG. 10, the coil winding portion 24 has a width that increases gradually from the inside toward the outside in the radial direction, so that when the core sheets are laminated, the teeth surface 22 side takes a trapezoidal shape.

As shown in FIGS. 2, 3A and 3B, at both ends (in FIG. 10, both ends at the right and left direction) in the circumferential direction of the teeth surface 22, a first slot surface 25 and a second slot surface 26 are provided to form a slot between the adjacent pole members 21a to 21i.

In FIGS. 3A and 3B, the first slot surface 25 is the side surface on the left-hand side toward the front of the pole member 21a, and faces to the second slot surface 26 of the adjacent pole member 21i (refer to FIG. 2). The second slot surface 26 is the side surface on the right-hand side toward the front of the pole member 21a, and faces to the first slot surface 25 of the adjacent pole member 21b (refer to FIG. 2).

In this example, the first slot surface 25 and the second slot surface 26 are asymmetrical with each other. The second slot surface 26 is formed with a skew for reducing cogging torque, and has a more greatly inclined surface than the first slot surface 25.

The core sheets 23a to 23t are configured so that the width in the circumferential direction (width between the first slot surface 25 and the second slot surface 26) increases gradually from the inside toward the outside in the radial direction. That is to say, by laminating the core sheets 23a to 23t, the stator core 23 is formed into a trapezoidal shape as viewed from the front.

Figure 4:
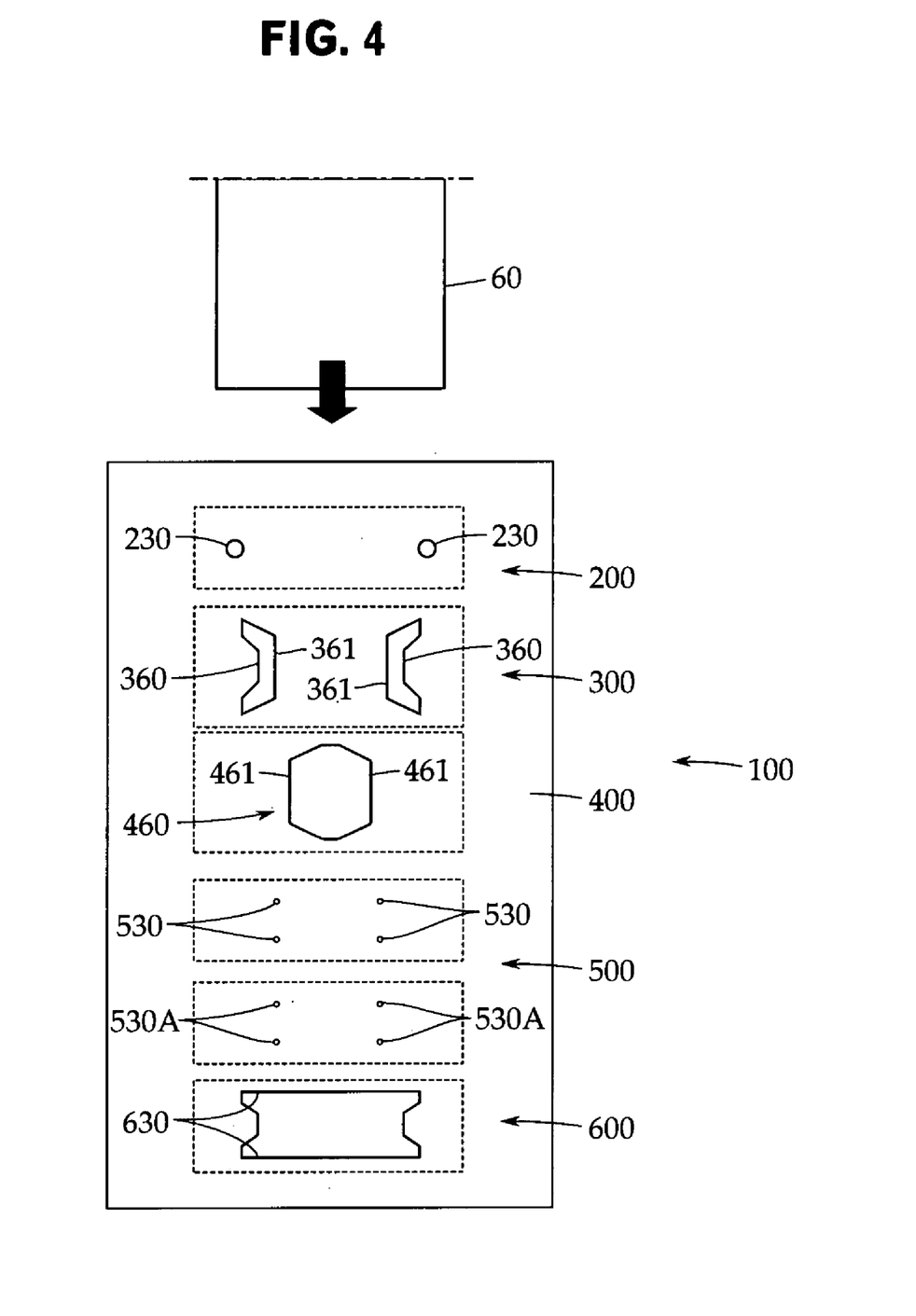
FIG. 4 is a schematic view of a die section of a manufacturing apparatus for an axial air-gap electronic motor in accordance with one embodiment of the present invention.
Figure 5:
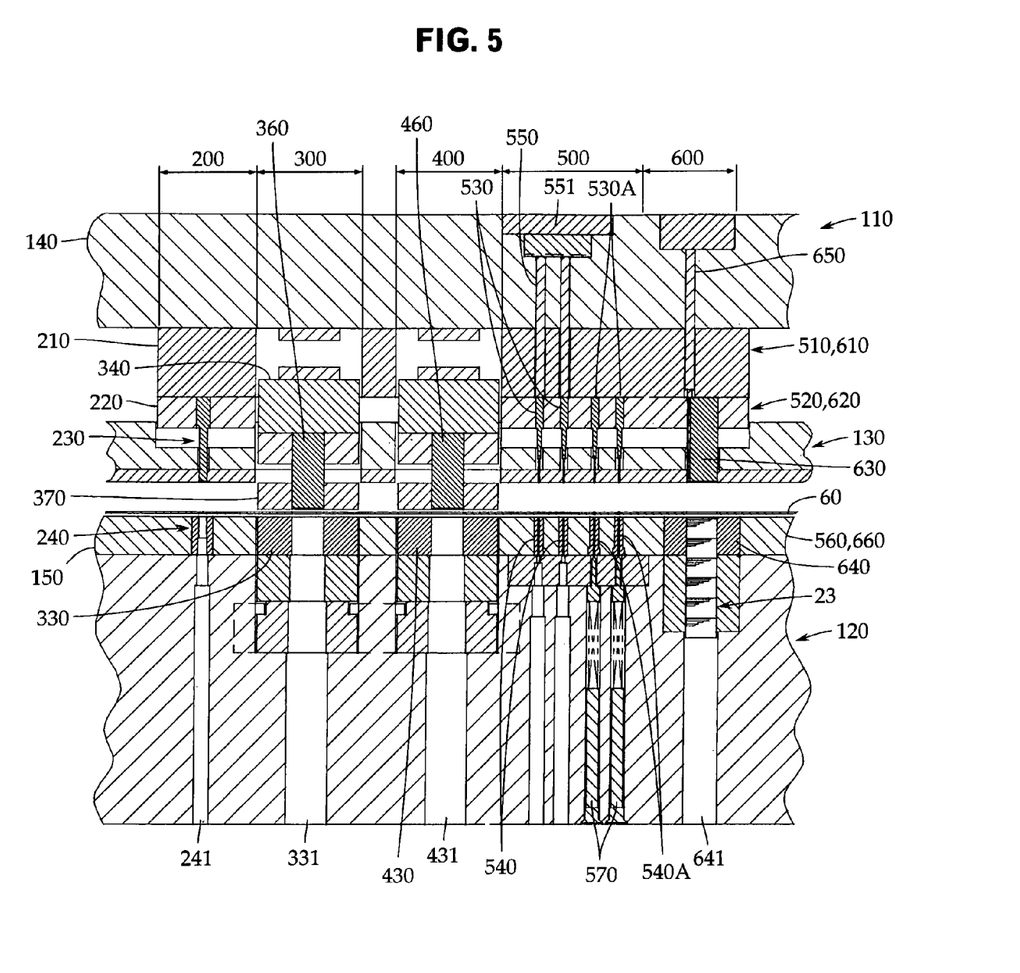
FIG. 5 is a main longitudinal sectional view of a drive section of a manufacturing apparatus.

Next, a manufacturing apparatus for manufacturing the stator core 23 is explained. FIG. 4 is a schematic view of a die section of a manufacturing apparatus for the axial air-gap electronic motor in accordance with one embodiment of the present invention, and FIG. 5 is a longitudinal sectional view of a main drive section of the manufacturing apparatus. A die is mounted on a press device, not shown. In the present invention, the specific configuration of the press device is an arbitrary item, so that the explanation thereof is omitted.

As shown in FIGS. 4 and 5, a manufacturing apparatus 100 for the stator core is of a sequent arrangement type having a punch 110 attached to the upper part of the press device, not shown, and a die 120 attached to the lower part of the press device as the receiver side of the punch 110, and is a press molding machine of a sequentially sending type in which a mother sheet 60 consisting of a magnetic steel sheet is finished to a final molded product while sequentially sending the mother sheet 60 with fixed intervals between the punch 110 and the die 120.

Above the die 120, a sheet guide (not shown) for guiding the transfer of the mother sheet 60 is provided, and a fixed stripper structure in which a fixed stripper 130 is fixed on the sheet guide is provided. Thereby, a tunnel-shaped mother sheet transfer path for transferring the mother sheet 60 is formed between the die 120 and the fixed stripper 130.

The punch 110 and the die 120 are provided with blanking stages as described below so that the final molded product (the stator core 23) is completed after passing through the blanking stages. Specifically, the punch 110 and the die 120 includes a pilot hole blanking stage 200 at which pilot holes 61 (refer to FIG. 8) serving as a reference guide for blanking are formed in the mother sheet 60, a first blanking stage 300 at which a first side surface (the first slot surface 25) in the circumferential direction of the core sheets 23a to 23t (hereinafter, a unit core sheet is denoted by 23at) of the stator core 23 is blanked out of the mother sheet 60, a second blanking stage 400 at which a second side surface (the second slot surface 26) in the circumferential direction of the core sheet 23 is blanked out of the mother sheet 60, a concave/convex forming stage 500 at which concave/convex portions for laminating and stakingly fixing the core sheets 23a to 23t are formed in a part of the core sheet 23, and a third blanking stage 600 at which the core sheets 23a to 23t are separated in succession from the mother sheet 60 to be laminated.

Referring to FIG. 5, at the pilot hole blanking stage 200, a punch backing 210 attached to a punch holder 140 that is attached so as to be capable of being reciprocatingly moved up and down by a press driving means, not shown, a punch plate 220 attached to the punch backing 210, and pilot hole forming punches 230 attached detachably to the punch plate 220 are provided on the punch 110 side.

On the die 120 side, pilot hole forming dies 240 for receiving the pilot hole forming punches 230 are attached to a die plate 150. On the rear end side of the pilot hole forming die 240 (on the lower end side in FIG. 5), a discharge hole 241 for discharging a scrap produced by the blanking work is formed.

Figure 6:
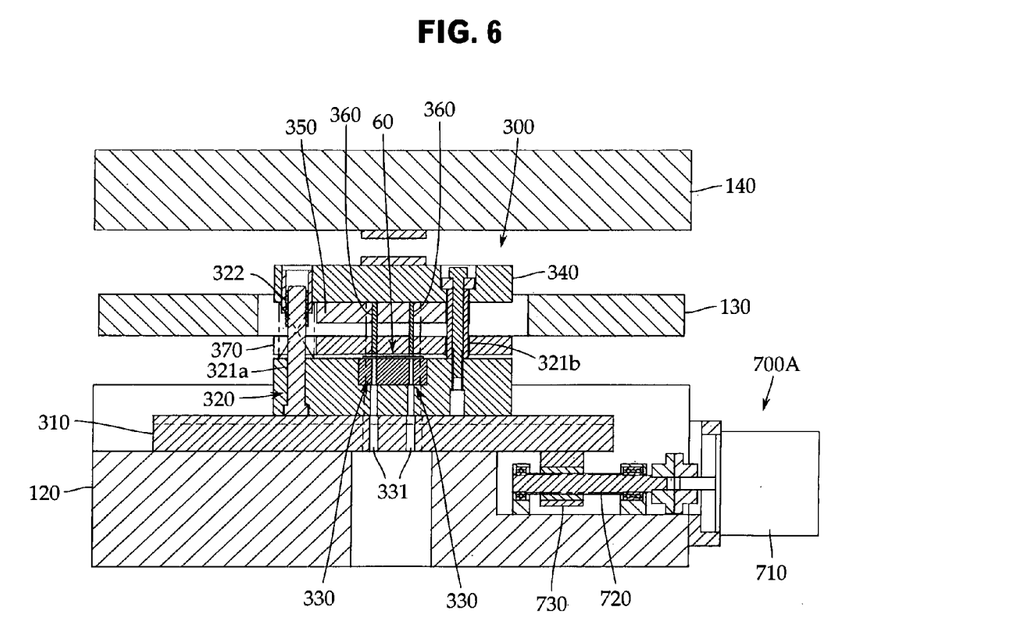
FIG. 6 is a transverse sectional view of a first blanking stage.

Next, referring additionally to FIG. 6, the first blanking stage 300 is explained. The first blanking stage 300 is arranged on a slide base 310 that is attached to the die 120 so as to be slidable along a predetermined direction. At one end of the slide base 310, a first driving means 700A for reciprocatingly sliding the slide base 310 is provided.

The first driving means 700A is a feed screw mechanism having a servomotor 710 that is controlled by a control means, not shown, an externally threaded shaft 720 that is rotatingly driven by the servomotor 710, and a follower 730 that is fixed to the slide base 310 and converts a rotational driving force into a driving force in the right and left direction by means of an internal thread engaging with the externally threaded shaft 720.

In this example, the first driving means 700A uses the feed screw mechanism utilizing the external thread and the internal thread. However, besides, a rack and pinion mechanism, a linear driving mechanism, and the like may be used. The first driving means 700A can be changed arbitrarily according to the specifications if it can reciprocatingly move the slide base 310.

The slide base 310 is provided with a die holder 320 that supports first dies 330, a punch holder 340 that is guided in the up and down direction by a guide post 321a erected vertically from the die holder 320 and a hanging bolt 321b, a punch plate 350 that is supported on the punch holder 340, and a pair of first punches 360 (first cutting portion) that are supported detachably on the punch plate 350. Between the die holder 320 and the punch holder 340, a stripper 370 is provided.

To the guide post 321a, compression springs 322 are attached coaxially. By the compression springs 322, the punch holder 340 is always raised in the separating direction (the upward direction in FIG. 6).

Figure 9:
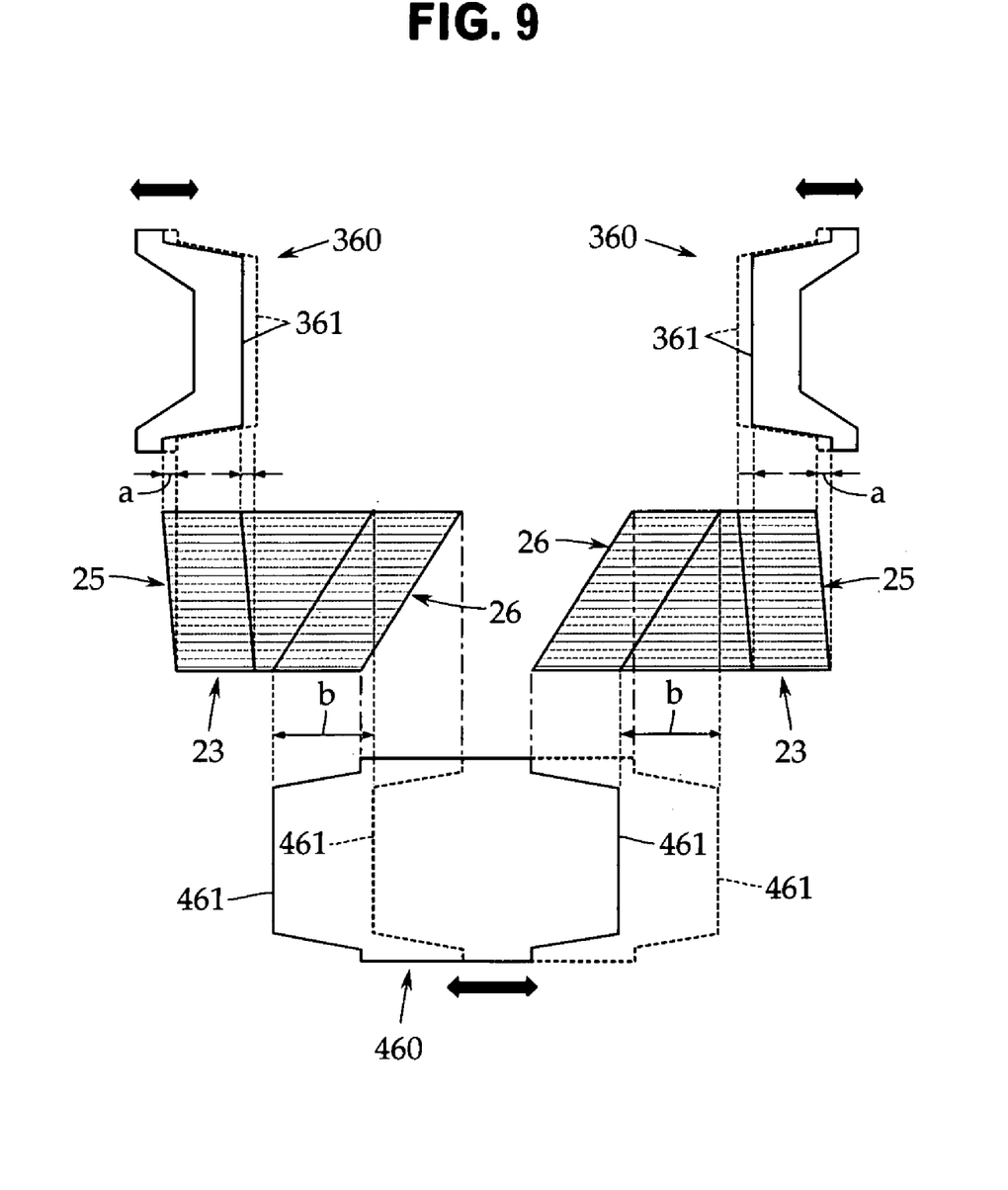
FIG. 9 is an explanatory view for explaining movement of a first blanking punch and a second blanking punch.

As shown in FIG. 9, the paired right and left first punches 360 are arranged symmetrically with a predetermined clearance being provided therebetween. Since the first punches 360 have the same shape, explanation is given by taking one first punch 360 as an example.

The first punch 360 consists of a blanking die formed into a trapezoidal shape, and on one surface thereof, a cut surface 361 for forming the first slot surface 25 is formed. In this example, to form the inclined surface of the first slot surface 25, the first punch 360 moves minutely while blanking the core sheets 23a to 23t in succession, and moves by a movement width a during the time from when blanking the first core sheet 23a to when blanking the final core sheet 23t.

Each of the first dies 330 consists of a blanking hole the shape of which coincides with that of the first punch 360, and on the other end side (the lower side in FIG. 6) thereof, a discharge hole 331 for discharging a scrap produced by blanking is produced.

Figure 7:
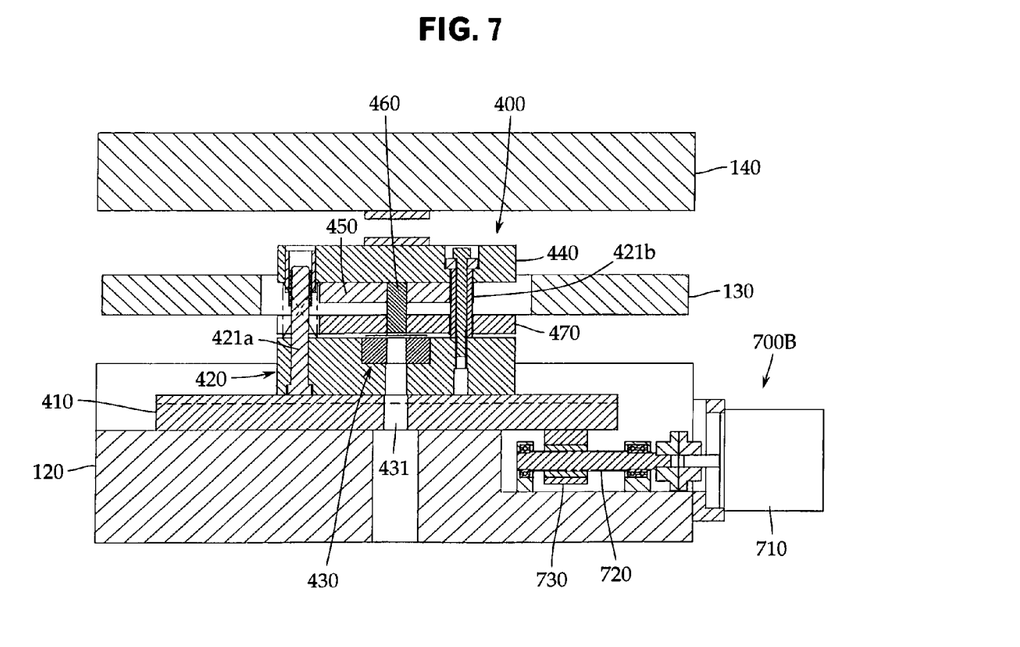
FIG. 7 is a transverse sectional view of a second blanking stage.

Next, the second blanking stage 400 is explained with reference to FIG. 7. The second blanking stage 400 is arranged on a slide base 410 that is attached to the die 120 so as to be slidable along a predetermined direction. At one end of the slide base 410, a second driving means 700B for reciprocatingly sliding the slide base 410 is provided.

The basic configuration of the second driving means 700B is the same as that of the driving means used at the above-described first blanking stage 300, so that the explanation thereof is omitted. The first and second driving means 700A and 700b are controlled individually by separate systems.

The slide base 410 is provided with a die holder 420 that supports a second die 430, a punch holder 440 that is guided in the up and down direction by a guide post 421a erected vertically from the die holder 420 and a hanging bolt 421b, a punch plate 450 that is supported on the punch holder 440, a second punch 460 (second cutting portion) that is supported detachably on the punch plate 450, and a hole 431. Between the die holder 420 and the punch holder 440, a stripper 470 is provided.

As shown in FIG. 9, the second punch 460 is formed into a trapezoidal shape, and on both surfaces thereof, a cut surface 461 for forming the second slot surface 26 is formed. In this example, to form the inclined surface of the second slot surface 26, the second punch 460 moves minutely while blanking the core sheets 23a to 23t in succession, and moves by a movement width b as a whole during the time from when blanking the first core sheet 23a to when blanking the final core sheet 23t.

In this example, the first punches 360 are provided in a pair at the right and left to blank two sheets of the core sheets 23a to 23t at the same time, and the second punch 460 is arranged between the first punches 360. However, unlike this example, one first punch 360 may be provided if one sheet of the core sheets 23a to 23t is simply blanked in succession. In this case, the second punch 460 is arranged so as to face to the first punch 360. Such a mode is also embraced in the present invention.

As a more favorable mode, two core sheets 23at are preferably blanked in point symmetry. Specifically, as shown in FIG. 9, by arranging the core sheets 23at at a point symmetry position, one second punch 460 has only to be moved reciprocatingly between two first punches 360. Two second punches 460 need not be provided, so that the production cost can further be reduced.

Referring again to FIG. 5, the concave/convex forming stage 500 is explained. The concave/convex forming stage 500 has a punch backing 510 attached to the punch holder 140 and a punch plate 520 attached to the punch backing 510. In the punch plate 520, cutting punches 530 and concave/convex forming punches 530A are detachably provided on the punch 110 side.

Figure 8:
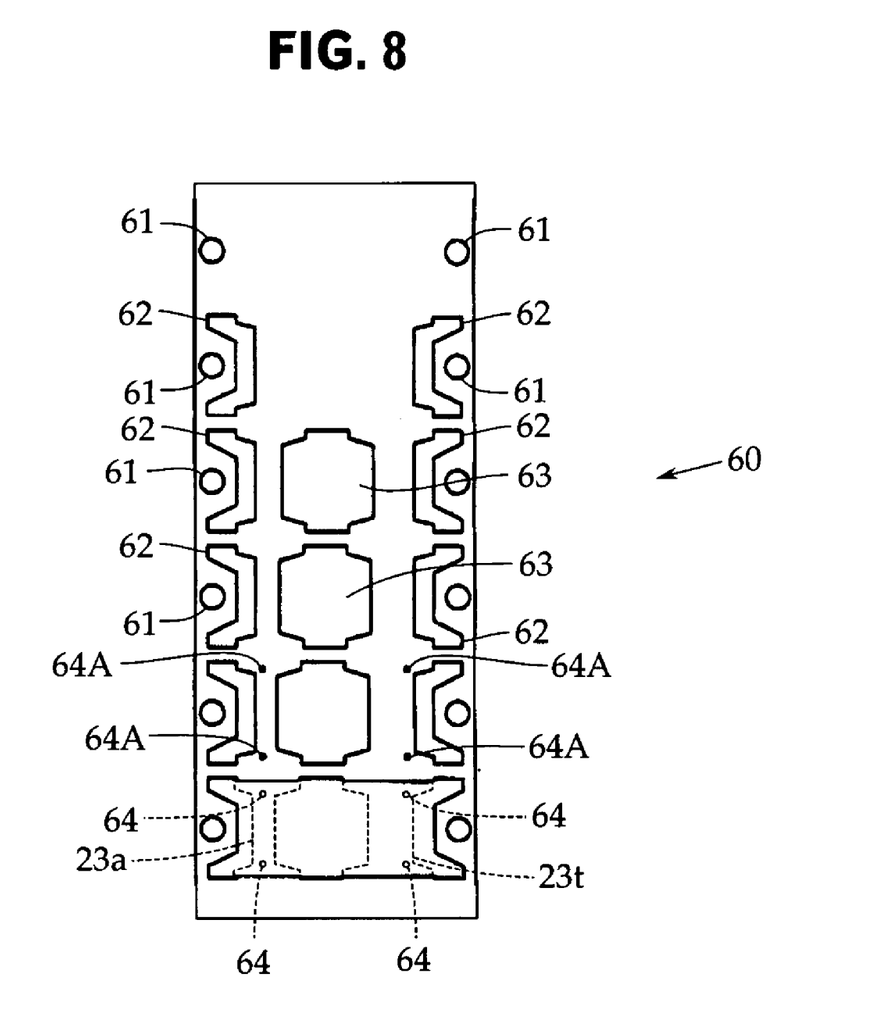
FIG. 8 is a front view showing a state of a mother sheet at each stage.

The cutting punches 530 and the concave/convex forming punches 530A are, as shown in FIG. 4, provided respectively at two places symmetrically in the right and left direction, at a total of four places, and are, as shown in FIG. 8, provided so that cut holes 64 and concave/convex portions 64A are formed in a coil winding portion 24 of the core sheet 23at.

The tip end of the concave/convex forming punch 530A projects so as to be shorter than the thickness of the base sheet 60. Therefore, by pressing the concave/convex forming punch 530A toward the base sheet 60, a concave is formed in the top surface of the base sheet 60, and a convex is formed in the back surface thereof along with the formation of the concave.

In this example, two of the four concave/convex forming punches 530A are fixed to the punch plate 520, and at the other end (the upper end in FIG. 5) of the cutting punch 530, a knockout rod 550 is installed.

At the rear end (the upper end in FIG. 5) of the cutting punch 530, a changeover lever 551 is provided. The changeover lever 551 is provided so as to be slidable (toward the front of the paper in FIG. 5) by a driving means, not shown, so that the projection and retreat of the cutting punches 530 are controlled by the changeover lever 551.

The changeover lever 551 is a lever that can change over the position of the cutting punch 530 from a projecting position to a retreating position and vice versa. Usually, the changeover lever 551 is supported at the retreating position, and only when the first core sheet 23a is conveyed to the concave/convex forming stage 500, the changeover lever 551 moves to the projecting position, by which the cut holes 64 are formed in the core sheet 23a. Thereby, even if the first core sheet 23a blanked next is laminated on the last core sheet 23t, these core sheets are not locked at the next third blanking stage 600.

On the die 120 side, cutting dies 540 and concave/convex forming dies 540A for receiving the cutting punches 530 and the concave/convex forming punches 530A, respectively, are attached to a die plate 560. The cutting dies 540 and the concave/convex forming dies 540A are provided at four places respectively so as to face to the cutting punches 530 and the concave/convex forming punches 530A. In the concave/convex forming die 540A, a knockout rod 570 is provided to prevent the mother sheet 60 from being fitted.

The knockout rod 570 consists of a plunger having a compression spring therein, and is provided so as to face to the concave/convex forming punches 530A not provided with the knockout rod 550. According to this configuration, the mother sheet 60 can be conveyed surely to the next third blanking stage 600.

Referring to FIG. 5, at the third blanking stage 600, a punch backing 610 attached to the punch holder 140, a punch plate 620 attached to the punch backing 610, and a third punch 630 attached detachably to the punch plate 620 are provided on the punch 110 side.

In this example, the punch backing 610 and the punch plate 620 are used in common with the punch backing 510 and the punch plate 520 at the above-described concave/convex forming stage 500.

On the rear end side (the upper end in FIG. 5) of the third punch 630, a knockout rod 650 is provided. The knockout rod 650 presses the concave/convex portion 64A of the core sheet 23 adjacently to the third punch 630 at the same time that twenty core sheets 23a to 23t are blanked, by which the concave/convex portions 64A of the core sheets 23a to 23t laminated on each other are engaged with each other.

On the die 120 side, a third die 640 for receiving the third punch 630 is attached to a die plate 660. On the rear end side (the lower end side in FIG. 5) of the third die 640, a discharge hole 641 for discharging the stator core 23 having been blanked and laminatedly fixed is formed.

Next, referring to FIG. 4 and FIG. 8, one example of a procedure for assembling the stator core for the axial air-gap electronic motor in accordance with the present invention is explained. First, the mother sheet 60 is set in the press device. Thereafter, by operating a start button, not shown, pressing work is started by a control means, not shown, in the press device. In FIG. 8, the flow direction of the mother sheet is from the upside to the downside in the same way as shown in FIG. 4.

The pressing work is performed at the same time at the work stages 200 to 600 by the reciprocating movement with fixed intervals of the punch 110 toward the die 120. However, hereunder, for convenience of explanation, the work processes of one core sheet 23a are explained for each stage in succession.

First, when the mother sheet 60 is conveyed to the pilot hole blanking stage 200, the control means lowers the punch 110 toward the die 120 via a pressing means, not shown. Accordingly, the pilot hole forming punches 230 held by the punch plate 220 are inserted into the mother sheet 60, by which the paired pilot holes 61 are formed in the mother sheet 60.

When the pilot hole forming punches 230 are raised and return to the initial positions, the control means pushes out the mother sheet 60 through a predetermined length and conveys it to the next first blanking stage 300 via a conveying means, not shown. After the mother sheet 60 has been sent out, the control means lowers the punch 110.

With the lowering of the punch 110, at the first blanking stage 300, the first punches 360 attached to the punch plate 350 are inserted into the mother sheet 60, by which the a pair of first punch holes 62 are formed on the mother sheet 60 (cutting of the first slot surface)

When the first punches 360 are raised and the punch 110 returns to the initial position, the control means sends out the mother sheet 60 through a predetermined length via the conveying means, and lowers the punch 110 again. At the same time, the control means gives a command to the drive motor 710 of the first driving means 700 to move the first punches 360 by a movement amount Δa (=a/20) corresponding to one sheet of the core sheets 23a to 23t. Thereby, preparations are made for the second core sheet 23b to be blanked next.

Subsequently, the control means lowers the punch 110 again. Along with this operation, at the second blanking stage 400, the second punch 460 is inserted into the mother sheet 60 along with the lowering of the punch 110. Thereby, a second blanking hole 63 is formed in the mother sheet 60 (cutting of the second slot surface).

When the blanking work of the second blanking hole 63 is finished, the punch 110 is raised and returns to the initial position, and the mother sheet 60 is sent out to the next concave/convex forming stage 500. At the same time, the control means gives a command to the second driving means 700 of the third blanking stage 400 to move the second punch 460 by a movement amount Δb (=b/20) corresponding to one sheet of the core sheets 23a to 23t. Thereby, preparations are made for the second core sheet 23b to be blanked next.

Checking that the mother sheet 60 has been conveyed to the concave/convex forming stage 500, the control means lowers the punch 110. Thereby, the concave/convex forming punches 530A are pushed into the mother sheet 60, by which the concave/convex portions 64A are formed at two places on the top and back surfaces of the coil winding portion 24 of the core sheet 23a.

When judging that the first core sheet, in this example, the core sheet 23a has been conveyed, the control means changes over the changeover lever 551 for the cutting punches 530 to the projection side to form the cut holes 64 by using the cutting punches 530. When the subsequent blanking work for the core sheets 23b to 23t is performed, the changeover lever 551 is moved to the retreat side, and the concave/convex portions 64A are formed on the core sheets 23b to 23t by using the concave/convex forming punches 530A.

After the concave/convex portions 64A have been formed, the mother sheet 60 is conveyed to the last third blanking stage 600, and at the same time, the punch 110 begins to lower. Thereby, the third punch 630 is inserted into the mother sheet 60, by which the core sheet 23a is separated from the mother sheet 60 (cutting of the teeth surface).

The separated core sheet 23a is laminated on the last core sheet 23t blanked before, and at the same time, is pushed in by the third punch 630. However, since the cut holes 64 are provided in the core sheet 23a in place of the concave/convex portions 64A, the core sheet 23a and the core sheet 23t are not connected to each other.

A series of the work processes is repeated. The core sheets 23b to 23t are laminated in succession on the core sheet 23a, and are pushed in by the third punch 630 to engage the concave/convex portions 64A with each other. Thereby, the core sheets 23a to 23t are connected to each other, and thus the stator core 23 is completed.

The present application is based on, and claims priority from, Japanese Application Number JP2006-070580, filed Mar. 15, 2006 the disclosure of which is hereby incorporated by reference herein in its entirety.

The invention claimed is:

1. A method for manufacturing a stator core for an axial air-gap electronic motor in which a stator and a rotor are arranged opposedly, the stator core comprising a plurality of core sheets having a trapezoidal shape with a circumferential width increasing gradually, the method comprising:
   a first blanking step in which first slot surfaces for two core sheets, opposed to each other, are blanked from a mother sheet by two first cutting portions spaced with a predetermined interval away from each other, and
   a second blanking step in which second slot surfaces for the two core sheets are blanked from the mother sheet by one second cutting portion, each of the second slot surfaces facing each of the first slot surfaces to thereby form portions for the two core sheets, each of the portions having first and second slot surfaces.

2. The method for manufacturing a stator core according to claim 1, wherein the first and second blanking steps are repeated n times so as to form n pairs of core sheets, the second cutting portion being moved incrementally farther from one of the two first cutting portions and closer to the other of the two first cutting portions with each repetition of the second blanking step.

3. The method for manufacturing a stator core according to claim 2, wherein the mother sheet is first cut for forming a first core sheet on one side and a last core sheet on the other side thereof.

4. The method for manufacturing a stator core according to claim 3, wherein another mother sheet is cut for forming a second core sheet on the one side and a next to the last core sheet on the other side thereof after moving the second cutting portion from a previous position.

5. The method for manufacturing a stator core according to claim 2, wherein the stator core is assembled in point symmetry by laminating the core sheets blanked out of mother sheets.

6. The method for manufacturing a stator core according to claim 1, further comprising a third blanking step to completely separate the core sheets from the mother sheet by a third cutting portion after the first and the second blanking steps.

7. The method for manufacturing a stator core according to claim 6, further comprising a concave/convex forming step performed between the second blanking step and the third blanking step to form a concave/convex portion for laminating and fixing the core sheets.

8. The method for manufacturing a stator core according to claim 1, further comprising a pilot hole blanking step to form a pilot hole, which serves as a reference for the blanking steps in the mother sheet.

* * * * *